Patented June 13, 1933

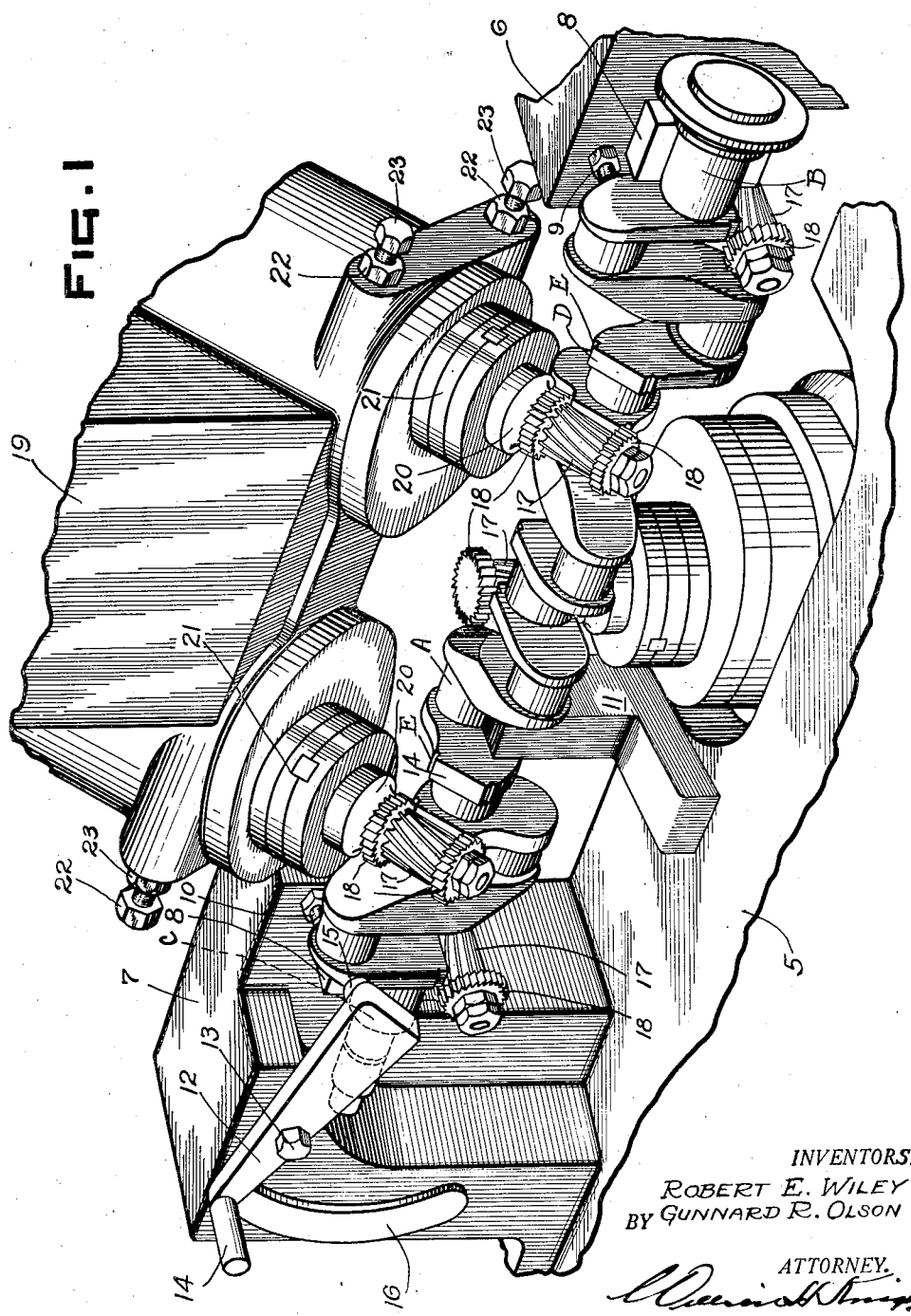

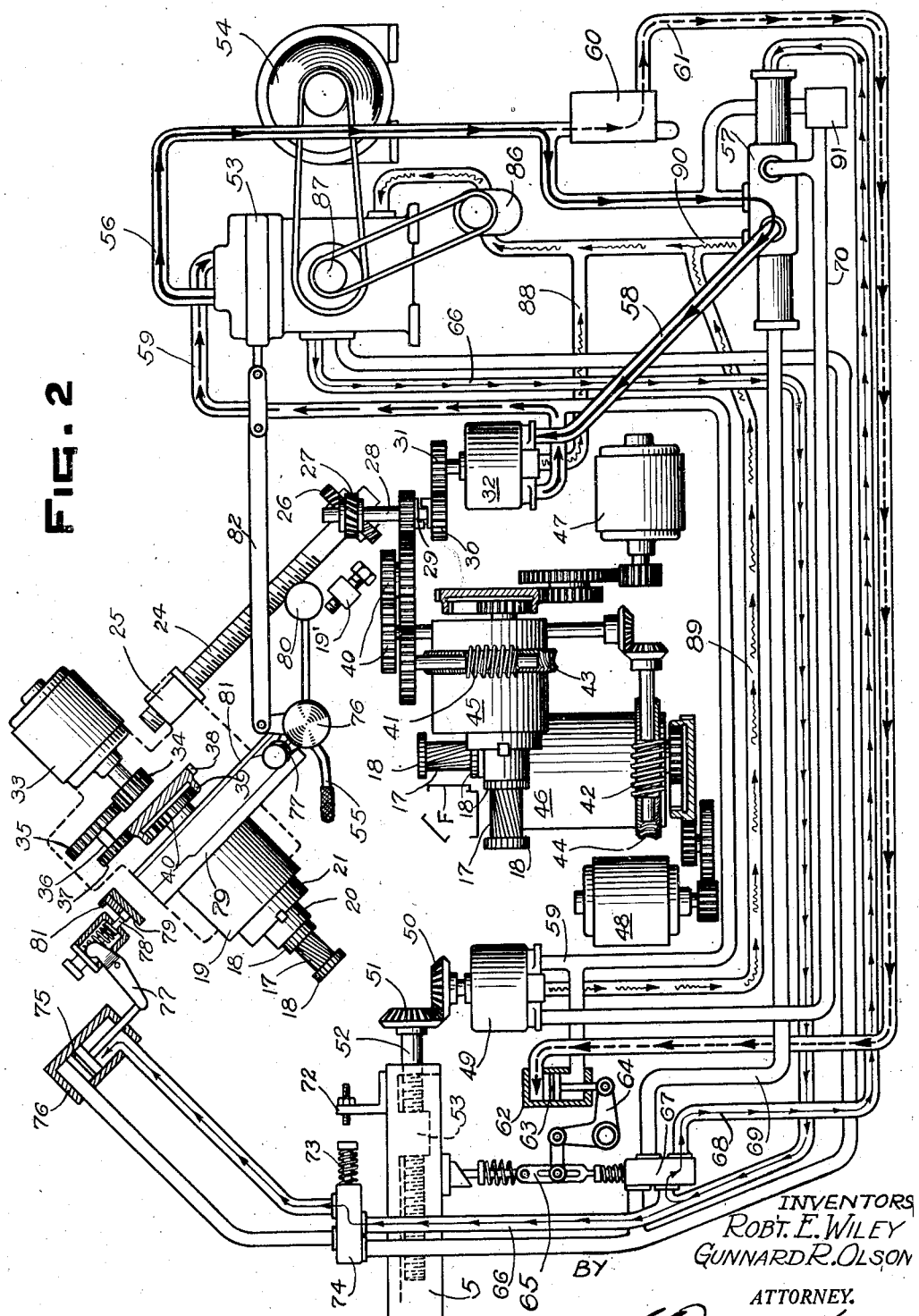

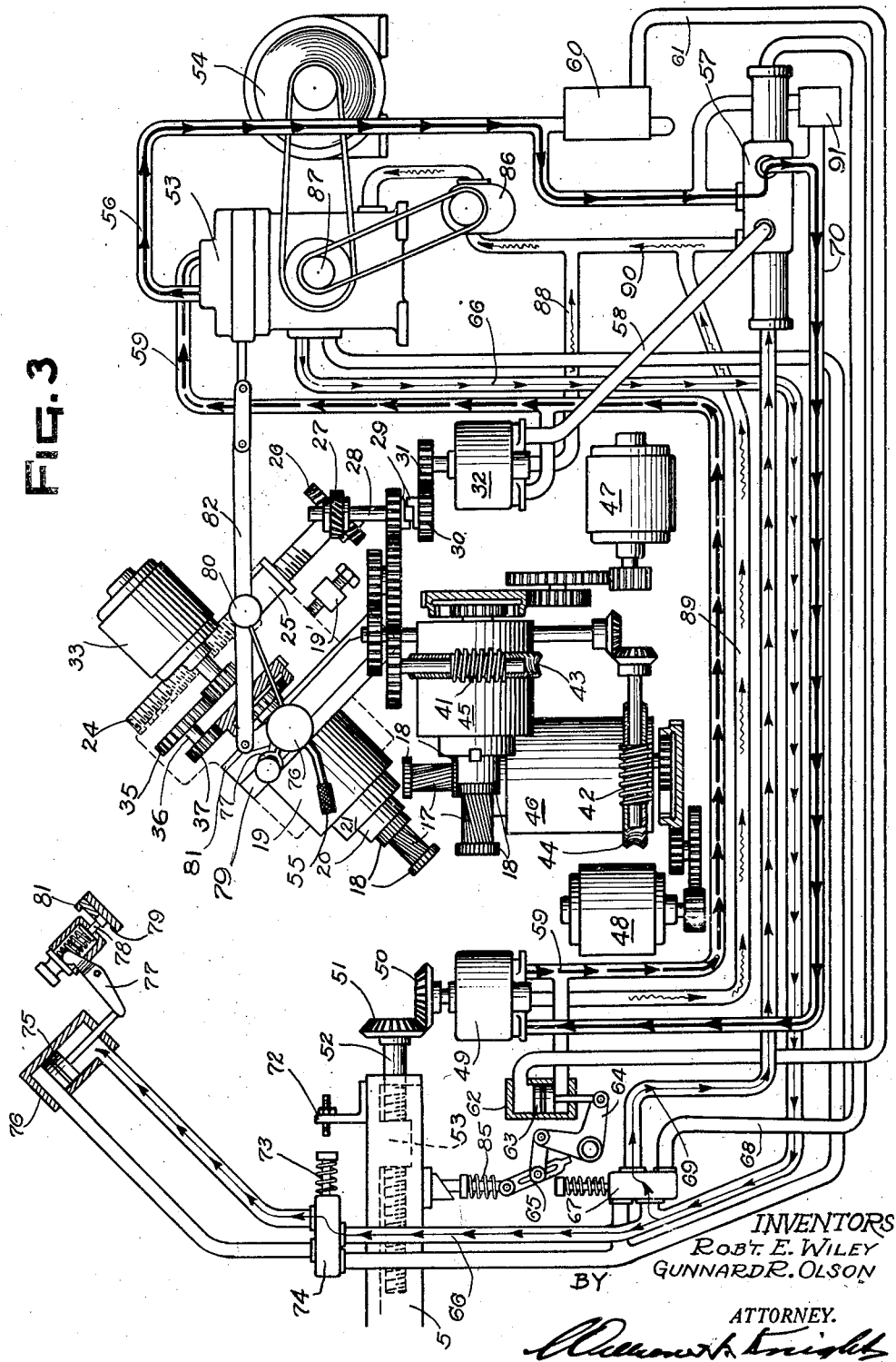

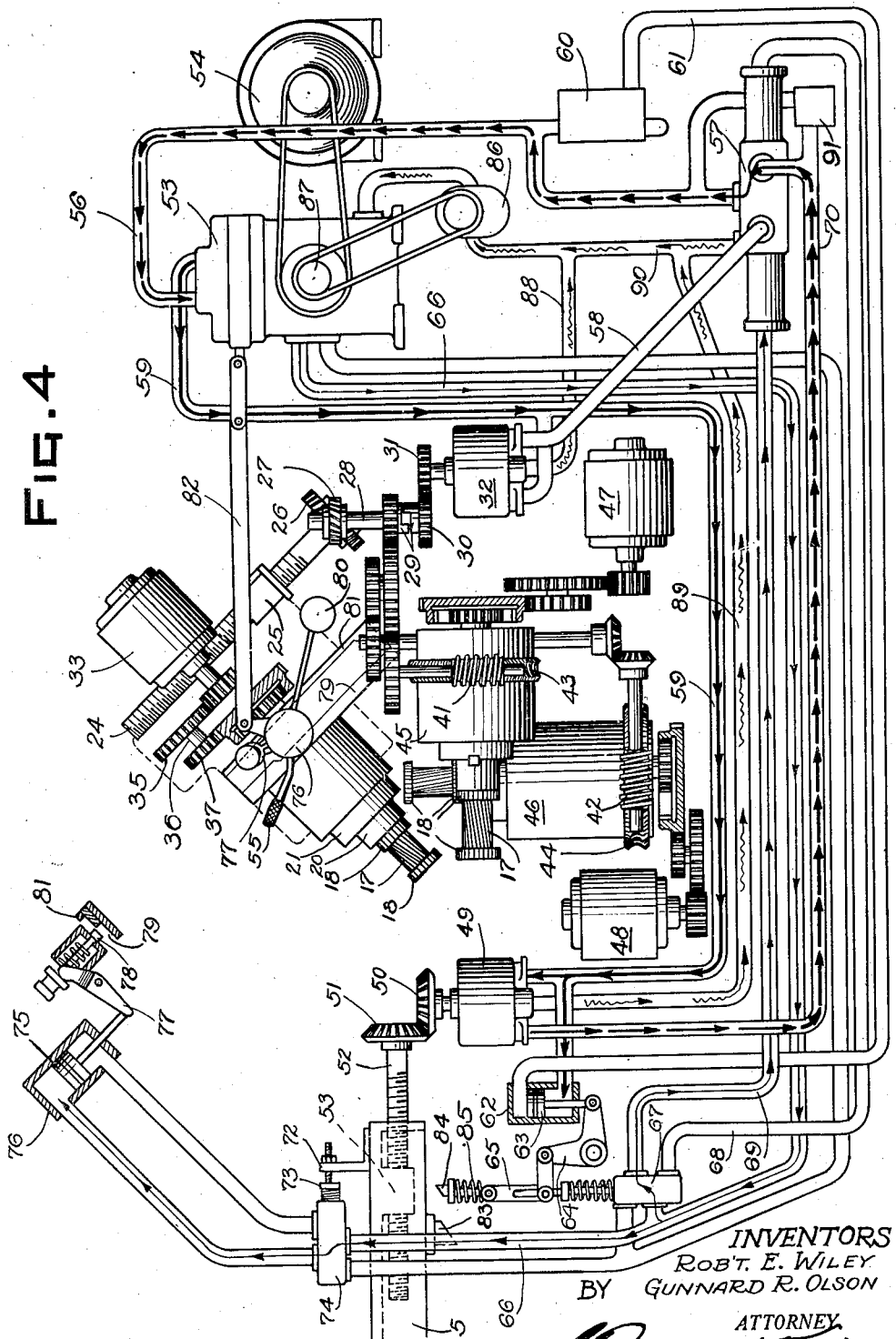

1,913,781

UNITED STATES PATENT OFFICE

ROBERT E. WILEY AND GUNNARD R. OLSON, OF ROCKFORD, ILLINOIS, ASSIGNORS TO THE INGERSOLL MILLING MACHINE COMPANY, OF ROCKFORD, ILLINOIS, A CORPORATION OF ILLINOIS

MACHINE TOOL

Application filed August 30, 1930. Serial No. 478,880.

The present invention relates in general to machine tools and has reference more particularly to a milling machine designed especially for speeding up the production of crank shaft milling operations without sacrificing accuracy.

Some types of counter-balanced crank shafts require milling operations to accommodate the weights and as heretofore practiced these milling machines have resulted in time losses due primarily to the necessity of the several set-ups required for each shaft. In other words, the only machines heretofore available for milling the so-called "weight-fits" on crank shafts have made it necessary to re-set the shaft in the fixture several times due to the relative angularity of the surfaces to be milled.

With the present invention these several set-ups are no longer required and it is possible to complete the milling of a shaft with one set-up. This is not only a saving in time but better assures accuracy.

Another of the several important features of the invention resides in speeding up the loading and unloading time, to which end, the machine is made to conveniently receive the shaft and quickly clamp it in position. The same conditions prevail for unloading as the operator can quickly release the shaft and easily remove it.

While the above briefly explains several of the salient features of the invention, at least so far as concerns the principle of the machine, other important features will be referred to throughout the following description of the accompanying drawings which have been selected to illustrate a preferred embodiment of the invention.

In the drawings:

Fig. 1 is a view in perspective of a machine constructed in accordance with the present invention showing the preferred way of reducing the invention to practice;

Fig. 2 is a diagrammatic view showing the relative position of the machine parts at one stage in the cycle of operation;

Fig. 3 is a similar view of another stage in the cycle; and

Fig. 4 is a similar view of still another stage in the cycle.

Before referring to the drawings in detail it should be first explained that the operating cycle of the machine is automatically carried through with the aid of hydraulic apparatus and that the circuit employed is substantially if not wholly automatic.

In performing a milling operation the crank shaft is set-up on the fixture of the machine and properly clamped in place. Owing to the design of the fixture no special care is required for the set-up, it is only necessary to place the shaft in place and it becomes for all practical purposes self-aligning. As soon as the shaft has been set up and clamped the operator then initiates the cycle which comprises moving the cutters from their at rest position into their working positions in milling relation with the weight-fits on the shaft.

With the aid of the hydraulic apparatus which not only moves the cutter into position the work is then automatically moved to successively present the surfaces to be machined, to the cutters. After the completion of the machining operation the work is automatically returned to its starting position with the cutters automatically resting clear of the work; thereupon the operator may release the fixture clamps and remove the shaft.

Referring now to the drawings in detail, A represents a crank shaft for an eight cylinder motor vehicle engine having main bearings as at B and C adjacent its ends and the customary number of intermediate main bearings. The shaft is clamped in a fixture which comprises a table structure 5. The table is preferably mounted on ways (not shown) as is common with most machine tools where tool heads or work holders are translated. Positioned to accommodate the ends of the shaft A are uprights 6 and 7 which are equipped with blocks 8, having half bearing openings in the faces thereof for the reception of the main end bearings B and C of the shaft. Adjacent the blocks 8 are stops 9 and 10 against which two of the throws of the shaft come to rest. These stops may be conveniently made from threaded bolts or the like with lock nuts threaded thereon to bear against the face of the uprights and hold an adjustment of the stops.

Included in the table structure 5 is a pedestal support 11 for supporting the shaft intermediate its ends. Mounted at the front of the uprights 6 and 7 are pivoted clamping levers 12. Only one of these levers is shown but it can be considered that the upright 6 is equipped with one the same as upright 7. These levers are pivoted as at 13 and have a hand grip 14 by which they may be thrown from an inactive position which will bring them down in front of the shaft with the knobs 15 wiping against the side of one of the throws of the shaft and effecting a rigid clamping action. A guide segment 16 is located on the front of each of the uprights 6 and 7 for the clamping levers. It will also be desirable to employ a hold down clamp for the shaft and this can be provided in any way suitable for the purpose. The idea being to construct a work holder or fixture which will enable the shaft to be set up quickly and accurately.

On an eight cylinder engine there will be eight weight-fits to be milled. These weight-fits are pad-like surfaces illustrated as at D and are made to accommodate counter-balance weights. The weights are fastened to the surfaces D by screws or other means suitable for the purpose and it is necessary that the surfaces be finished accurately. It therefore follows that these surfaces D must be milled and at the same time shoulders such as E must be provided for at opposite sides of the surfaces D and these likewise must be milled.

According to the present method each one of the weight-fits is individually milled, in other words, the cutters operate on each of the surfaces separately and at the same time mill the shoulders E moving from one surface to another. For this reason each of the cutters includes an arbor section 17 and two end sections 18 spaced apart by the arbor section 17 a proper distance to machine the shoulders E while the arbor sections are machining the surfaces D.

The two cutters which are carried by the head 19 at an angle to the vertical are each mounted on a tapered shank 20 which in turn is mounted in an eccentric quill 21. To adjust the position of these two cutters the eccentricity of the quills may be adjusted by turning in or out on the adjusting bolts 23 and holding the adjustment with the lock nuts 22. It will be readily seen by turning the quills 21 the eccentric mounting therefore will change the relative position of the cutters to the shaft.

The head 19 is mounted to slide upon the ways (not shown) the same as any reciprocating machine tool head and this sliding movement is accomplished by a feed screw 24 threaded through a nut 25 on the head. By turning the screw 24 in one direction the head will be moved up and when the screw is rotated in an opposite direction the head is pulled down. The screw is rotated forward and reverse by means of a driven gear 26 on the end thereof which meshes with a drive gear 27 on the end of a shaft 28. The shaft 28 is connected through a lost motion device 29 with a driven gear 30 which meshes with the drive gear 31 on the shaft of an oil motor 32. When the motor 32 is driven in one direction the head will be pulled down and when the direction of the motor 32 is reversed the head will be moved up.

The position of the tools carried by the head 19 is controlled hydraulically but the tools themselves are each driven by a separate and independent electric motor 33 which is connected with the drive spindles of the tools. The drive gear 34 on the end of the motor shaft meshes with the gear 35 on a stub shaft 36. The stub shaft 36 also carries a spur gear 37 which meshes with the external teeth 38 on the periphery of a ring gear which has an internal gear 39 meshing with the spur gear 40 on the tool spindles. Each of the cutters carried by the head 19 is so driven.

In addition to the cutters above referred to, is a horizontal bank and one perpendicular intermediate cutter. The horizontal bank which is two in number are not mounted alike for the reason that the one to the left (viewed from Fig. 1) is mounted in a stationary position and does not change its position whereas the one on the right (viewed from Fig. 1) does necessarily need to move out of the way to set up the shaft.

By referring to Fig. 2 it will be seen how the cutters are removed from an at rest position into cutting position. The triangular design F represents the crank shaft. Both the vertical cutter and the right hand (viewed from Fig. 1) cutters are eccentrically mounted. They are therefore revolved in their eccentric mountings to turn them from a rest position to a cutting position. This revolving movement is accomplished by means of the oil motor 32. The drive being off gears 31, 30 through the lost motion device 29 and from the shaft 28 through the reducing unit 40 to the worm 41 for the horizontal cutter and to the worm 42 for the vertical cutter. The worms 41 and 42 mesh with the worm gears 43 and 44 respectively and the worm gears are in turn fixed to the drum-like mountings 45 and 46. It will thus be seen by turning the drums 45 and 46 the cutters will be turned to and from their terminal working positions.

Each of these cutters are also individually driven by electric motors with the same type of hook-up as explained with reference to the cutters in the head 19. The motor 47 drives the horizontal cutter and the motor 48 drives the vertical cutter. The left hand horizontal cutter may be connected direct to the shaft of a motor (not shown) similar to the motors 47, 48.

The reciprocation of the table 5 is accomplished by an oil motor 49 which has a bevel gear 50 on the shaft thereof meshing with a like gear 51 on the end of the feed screw 52. The screw 52 is threaded in a feed nut 53 fixed underneath the table 5.

The oil motors 32 and 49 are preferably constant displacement motors.

Before going further into the description of the equipment used on the machine an explanation of the operating cycle will be made so that the details of the oil circuit will be better understood. In the first place, after the shaft has been set up in the fixture the operator initiates the cycle by a control valve. The head 19 then moves down from the position shown in Fig. 2 into a position shown in Fig. 3. During the down movement of the head 19 the eccentric quills for the vertical cutter and the right hand (viewed from Fig. 1) horizontal cutter are actuated to position these cutters in milling position. It is to be understood that all the cutters are rotating during their positioning movements. When the cutters are properly positioned the table feed is automatically thrown in which feeds the table with the shaft carried thereby to the left (viewed from Fig. 1) this movement of the table presents the second series or the other half of the surfaces D to the cutters. After the second half of the surfaces have been milled the table is automatically returned to its starting position where it comes to rest. The return of the table to its starting position also automatically turns the vertical and right hand cutter clear of the shaft and elevates the head 19. The cutters continue to rotate while the table is reloaded so that all the operator has to do to repeat the cycle for the next shaft is to actuate the control valve as previously described.

The hydraulic apparatus comprises a variable delivery oil pump 53 driven by an electric motor 54.

With the cutters all rotating and in position as shown in Fig. 2 and with the oil-pump 53 operating the operator opens the control valve in the pump by throwing the lever 55. The oil is pumped through the pipe 56 to the three-way valve 57 to the oil motor 32 through the pipe 58 thus driving the motor in a direction to pull the head 19 down. The return between the motor and the pump comprises the pipe 59. This same motor 32 also is used for the motive power to revolve the vertical and right hand horizontal cutter mountings 45 and 46.

When the head 19 comes against the stop 19' the pressure built up in the delivery line will overcome the resistance of the foot valve 60 opening the same and passing the oil pressure through the piping 61 to the cylinder 62. The action of the piston 63 will rock the bell crank 64 breaking the link connection 65 as shown in Fig. 3.

An auxiliary delivery from the pump 53 is delivered into the piping 66 through the valve 67 into the pipe 68 to one of the ports in the three-way valve 57. This pressure in the pipe 68 works against the piston in one end of the valve 57 to hold the valve open for delivery of the main pressure to the motor 32.

When the head 19 comes against the stop 19' and the other tools have been moved to the limit of their positions the built up pressure opens the valve 60 as previously stated. The pressure in the pipe 61 now breaks the link connection 65 opening the valve 67 (see Fig. 3). The pressure is now delivered to the piping 69 changing the three-way valve 57 to deliver the main pressure into the pipe 70 which is connected to the intake of the table motor 49. This starts the table feed. The return for the table motor is through the piping 59 to the pump.

There is always a constant auxiliary pressure in the pipe 66. Now when the member 72 on the table moves against the plunger 73 of the valve 74 the valve is shifted to transfer the pressure to the opposite side of the piston 75 in the cylinder 76 as shown in Fig. 4. The movement of the piston 75 thus realized operates the pivoted yoke 77 and raises the follower above the cam surface allowing the weighted arm 80 to fall. When the arm 80 drops the follower 78 is positioned against the cam 81 and the rod 82 is thrust to the right view from Fig. 2. This movement on the part of the rod 82 reverses the direction of the oil pressure delivered by the pump 53. Fig. 4 shows this reverse direction wherein the pressure instead of being delivered out the pipe 56 is returned through this pipe and delivered through the pipe 59. This reversal of the circuit reverses the direction of the table motor 49 to return the table. A portion of the pressure thus delivered to the motor 49 is also delivered to the cylinder 62 and raises the piston 63 and resetting the link connection 65 so that when the table returns the cam stud 83 will ride the part 84 and impart a downward thrust against the action of the spring 85 and shift the valve 67 which in turn changes the auxiliary pressure to the three-way valve 57 shifting the same and reversing the motor 32 so as to return the head 19 to its elevated position and at the same time revolving the eccentric mountings for the vertical and right hand horizontal tools.

To keep the system free of excessive oil leaks a drain pump 86 is belt driven off the shaft 87 of the pump 53. Each of the motors 49 and 32 are piped as at 88 and 89 with this drain pump 86 and the three-way valve is also connected through the branch 90. The drain pump 85 pumps into the sump of the pump 53.

The variable delivery pump 53 is made for high and low pressures both of which are controlled by the valve actuated by the rod 82. The purpose of these two pressures which may be referred to as primary and secondary pressures or main and auxiliary is to utilize a feed with the main pressure and a quick traverse with the auxiliary pressure. A small part of the auxiliary pressure is also used for shifting the valve 57 as previously explained.

The head 19 is pulled down first with a quick traverse that goes into a feed when the cutters reach the work. It is also elevated by a quick traverse. The table is fed to the left viewed from Fig. 1 and returned with a quick traverse. This feed and quick traverse pressure is delivered from the pump 53 through the pipes 56 and 59 depending on whether the quick traverse is return or forward and the secondary pressure is created in the pump by a gear pump. As previously stated the valve which is actuated by the rod 82 throws over from a quick traverse to a feed and the position of the valve is controlled by the camming surface 79. When the head commences to come down just before it reaches the terminal working position of the cutters the camming device moves the rod 82 and the valve connected therewith to cut out the quick traverse and throw over into a feed. At the completion of the cutting cycle the came again throws over from a feed to a quick traverse which quickly elevates the head and also returns the work support with a quick traverse.

When the work support is returned to its starting position the camming stud 83 rides over the member 84 trips the valve 67 which in turn operates the foot valve 57 to cut out the motor 49 and shifts the circuit to the motor 32 for elevating the head 19 and revolving the tool mountings 41 and 46. It so happens that after the circuit has been shifted to the motor 32 the motor 49 continues to rotate momentarily and frequently the pressure thus built up in the pipe 70 is sufficient to damage the circuit. To prevent this possibility a resistance valve 91 is used to by-pass the valve 57 and connect the pipe 70 with the return 56. Now, if the pressure in the pipe 70 should be excessive it will simply open the valve 91 and flow into the pipe 56.

Having thus described and shown an embodiment of this invention, what we claim and desire to secure by Letters Patent of the United States is:

1. In a crank shaft milling machine, the combination of a reciprocal work support, a plurality of milling cutters angularly mounted relatively of the work support, means for translating the mountings for said angularly mounted cutters to position the cutters from one terminal position to another, means for revolving other of the mountings for the cutters from one terminal position to another and means for reciprocating the work support when the cutters are in their working terminal positions; whereby to machine the weight-fits on the crank shaft in one continuous operating cycle.

2. In a machine tool having a plurality of parts to be translated in sequence and with one of said parts having a quick traverse in two directions and a feed in one direction and the other of said parts having a feed in one direction and a quick traverse return, the combination of a transmission and control for said parts, comprising fluid pressure motors for movement of each of said parts, a fluid circuit including a source of fluid pressure supply for delivering fluid pressure to each of said motors, a cam controlled valve actuated by the position of one of said parts for changing the rate at which fluid pressure is delivered to one of said motors to change the movement of the part from a quick traverse to a feed, a stop against which said part is fed, a valve automatically operable at the limit of the feeding movement of said part to shift the fluid pressure in the circuit to the motor for the other of the parts to feed the same, and means for reversing the direction of said motors and returning both parts to start position with a quick traverse motion.

3. In a crank shaft milling machine, a work support mounted for translation to complete an operating cycle, a plurality of cutters mounted to machine the weight-fits on a crank shaft carried by said work support, a head in which some of said cutters are mounted, said head being mounted for translation to and from the work support to bring the cutters into the work, mountings for other of said cutters, said mountings being revolvable to bring the cutters into the work, a hydraulic motor for translating said head and revolving said mountings, a hydraulic motor for translating said work support, a source of fluid pressure supply for operating said motors, a fluid pressure circuit for supplying fluid pressure from said source to said motors, and means for first opening the circuit to the motor operating the cutter mountings and then opening the circuit to the work support motor.

4. In a machine for milling weight-fits on the ends of the connecting webs of counterbalanced crank shafts, the combination of a work support for holding the crank shaft in a horizontal plane, a plurality of milling cutters positioned to operate on the ends of the connecting webs, electric motors for driving said cutters, eccentric quills in which some of said cutters are mounted, means for revolving said quills for adjusting the operating positions of the cutters relatively of the crank shaft, a reciprocal carriage carrying some of the cutters, hydraulic means for reciprocating said carriage to move the cutters to and from the work and hydraulic means for moving the crank shaft longitudinally; whereby some of the cutters serve for milling more than one weight-fit.

5. In a machine for milling weight-fits on the ends of the connecting webs of counter-balanced crank shafts, the combination of a work support for holding the crank shaft, a plurality of cutters, positioned to operate upon the ends of the connecting webs, a reciprocal tool carriage for carrying some of the cutters at an angle to the vertical, eccentric quills in which some of the cutters are mounted for adjusting their operating positions relatively of the crank shaft, means for moving said tool carriage from a terminal position, which leaves the work support unobstructed for loading and unloading the crank shaft, into a cutter operating position, means operable during the reciprocation of said carriage for operating the eccentric quills on which some of the cutters are mounted and a hydraulic motor for feeding the crank shaft relatively of the cutters; whereby some of the cutters serve for milling more than one weight-fit.

6. In a crank shaft milling machine, the combination of a work support for holding the crank shaft, means for translating said work support to complete its operating cycle, a plurality of rotary cutters for machining the crank shaft means for driving said cutters, a carriage with which some of said cutters are movable from a terminal starting position, where they leave the work support unobstructed for loading and unloading the crank shaft, to a terminal working position and hydraulically operated apparatus for moving said carriage to position the cutters in their terminal working position and then automatically reciprocating the work support, said apparatus being also operable to return the carriage automatically to its terminal starting position after the reciprocation of the work support has been completed and comprising a primary and secondary fluid pressure circuit including a source of fluid pressure supply, a motor in said circuit selectively operated by primary or secondary fluid pressure in the circuit for operating the carriage, another motor in said circuit also selectively operated by a primary or secondary fluid pressure in the circuit for operating the work support, a cam controlled valve for automatically selecting the primary or secondary pressure for operating the motors and a valve in said circuit for reversing the direction of said motors and means for automatically shifting said valve.

7. In a machine tool, a rotary tool, means for driving said tool, a mounting for said tool, a fluid pressure motor, a connection between said motor and said mounting for moving the tool with the power developed by said motor from one terminal position to another and returning it to its terminal starting position, a work support mounted for translation, a fluid pressure motor for translating said work support from one terminal position to another and returning it to its terminal starting position, a fluid pressure pump, a circuit between said pump and said motors for delivering fluid under pressure to the motors and an inter-control for said motors in said circuit; comprising a multi-way valve, a foot valve responsive to the pressure built up in the circuit to the tool motor after the tool has been moved to a terminal operating position to shift said multi-way valve and connect the work support motor with said pump and means responsive to the pressure built up in the circuit to the work support motor after the work support has moved into a terminal position for changing the delivery of the pump to reverse said motors.

8. In a machine tool, a rotary tool, means for driving said tool, a mounting for said tool, a fluid pressure motor, a connection between said motor and said mounting for moving the tool with the power developed by said motor from one terminal position to another and returning it to its terminal starting position, a work support mounted for translation, a fluid pressure motor for translating said work support from one terminal position to another and returning it to its terminal starting position, a fluid pressure pump, a circuit between said pump and said motors for delivering fluid under pressure to the motors and an inter-control for said motors in said circuit; comprising a multi-way valve, a foot valve responsive to the pressure built up in the circuit to the tool motor after the tool has been moved to a terminal operating position to shift said multi-way valve and connect the work support motor with said pump and means responsive to the pressure built up in the circuit to the work support motor after the work support has moved into a terminal position for changing the delivery of the pump to reverse said motors, comprising a camming device carried by the tool mounting, a follower for said camming device, a valve responsive to the pressure built up in the circuit to the work holder motor for actuating said follower and changing its position relative to said camming device, a valve in said pump and an operating connection between said follower and said pump valve.

9. In a machine tool, a tool carriage, a screw feed for said carriage, a rotary tool carried by said carriage, a motor on said carriage for driving said tool, a fluid pressure motor for actuating said screw feed to move the carriage from a terminal starting position into a terminal working position and back to its terminal starting position, a work support mounted for translation, a fluid pressure motor for translating said work support from a terminal starting position into a terminal working position and back to its terminal starting position, a fluid pressure pump in circuit with said motors for delivering fluid under pressure to said motors and an intercontrol for said motors; comprising a valve in the pump circuit, means responsive to the fluid pressure built up in the tool carriage circuit to shift said valve and open the circuit to the work holder motor and means responsive to the pressure built up in the circuit to the work holder motor for changing the delivery of the pump and reversing said motors.

10. In a machine tool, a tool carriage, a screw feed for said carriage, a rotary tool carried by said carriage, a motor on said carriage for driving said tool, a fluid pressure motor for actuating said screw feed to move the carriage from a terminal starting position into a terminal working position and back to its terminal starting position, a work support mounted for translation, a fluid pressure motor for translating said work support from a terminal starting position into a terminal working position and back to its terminal starting position, a fluid pressure pump in circuit with said motors for delivering fluid under pressure to said motors and an inter-control for said motors; comprising a valve in the pump circuit, means responsive to the fluid pressure built up in the tool carriage circuit to shift said valve and open the circuit to the work holder motor and means responsive to the pressure built up in the circuit to the work holder motor for changing the delivery of the pump and reversing said motors, comprising a valve in said pump a camming device carried by the tool carriage, a follower co-operating with said camming device, means responsive to the fluid pressure built up in the work holder circuit for changing the position of said follower relative to said camming device and a weighted link-motion connecting said follower with said pump valve.

11. The combination as set forth in claim 10, in which the weighted link-motion between said follower and the pump valve is manually operable to initiate the operating cycle of the machine.

12. In a machine for simultaneously milling a plurality of angularly disposed portions of a work piece, the combination of a work holder, means for translating said work holder, a plurality of tools angularly mounted relatively of the work holder, an individual drive for each of said tools, a mounting carrying some of said tools, a screw feed for moving said mounting from a starting terminal position into a position to present the tools to the work, fluid pressure responsive means for operating said screw feed device, means for adjusting the tools relatively of said mounting, the other of said tools each having an individual mounting and means for revolving said mountings to move the tools thereof from a terminal starting position into a position to present the tools to the work, comprising a worm drive on each mounting, a motor responsive to fluid pressure and a geared drive between said motor and each of said worm drives.

13. In a machine for simultaneously milling a plurality of angularly disposed portions of a work piece, the combination of a work holder, a plurality of tools angularly mounted relatively of the work holder, a mounting carrying some of said tools, means for moving said mounting from a starting terminal position into a position to present the tools to the work, means for adjusting the tools relatively of said mounting, the other of said tools each having an individual mounting and means for revolving said mountings to move the tools thereof from a terminal starting position into a position to present the tools to the work and an individual drive for each of the tools.

14. In a machine tool, the combination of a translatable work support, a plurality of tools, mountings for said tools, means for translating some of said mountings to position certain of the tools from one terminal position to another, means for revolving other of the mountings to position other of the tools from one terminal position to another and means for translating the work support when the tools are in their working terminal positions; whereby to machine different portions of a work piece in one continuous operating cycle.

15. In a machine tool, the combination of a work support, a plurality of tools, a translatable mounting for some of said tools, fluid pressure means for moving said translatable mounting to position the tools from one terminal position to another, a revolvable mounting for each of the other of said tools, hydraulic means for revolving said mountings from one terminal position to another and means for driving said tools.

16. The combination as set forth in claim 15, in which the work support is mounted for translation.

Signed at Rockford, in the county of Winnebago, and State of Illinois, this 28 day of Aug., 1930.

ROBERT E. WILEY.
GUNNARD R. OLSON.